Dec. 29, 1970 R. F. JACK 3,551,903
ELEMENT INCLUDING BERYLLIUM-COPPER BASE
Filed Sept. 30, 1966 2 Sheets-Sheet 1

INVENTOR
R. F. JACK
BY George S. Indig
ATTORNEY

United States Patent Office 3,551,903

Patented Dec. 29, 1970

3,551,903

ELEMENT INCLUDING BERYLLIUM-COPPER BASE

Robert F. Jack, Springfield, N.J., assignor to Bell Telephone Laboratories, Incorporated, Murray Hill, N.J., a corporation of New York Filed Sept. 30, 1966, Ser. No. 583,207

Int. Cl. G11c *11/14;* C22c *9/00*

U.S. Cl. 340—174 9 Claims

ABSTRACT OF THE DISCLOSURE

When layers are deposited on wire made from commercially available beryllium-copper alloys, imperfections are observed which have been traced back to irregularities in the original wire surface caused by the cobalt, nickel and iron additives included in all commercially available alloys for added strength. Wires of greatly improved surface characteristics have been produced using new alloys substantially free of these additives.

Figure 1:
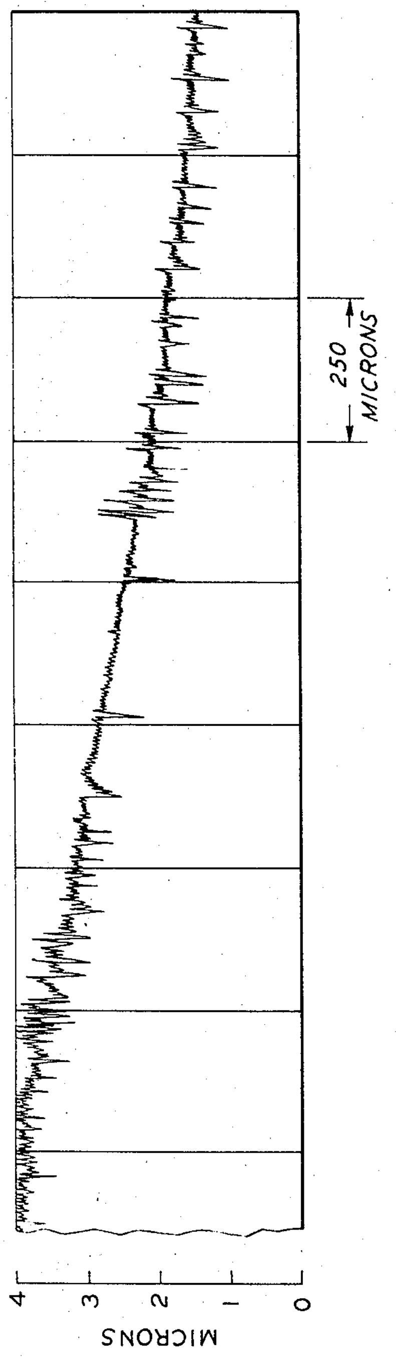

This invention relates to a new improved substrate for use in plated devices, such as plated magnetic memory devices. More particularly, this invention relates to a substrate composition consisting essentially of beryllium-copper alloy substantially free of cobalt, nickel, and iron, which has improved surface characteristics.

The use of easy directions of magnetization in magnetic wires to form an attractive nondestructive readout memory has taken root in communications and information retrieval fields. In the operation of this type of memory element, a strong magnetic anistropy is established which favors a selected orientation in a wire-like material. The orientation chosen is usually along the axial or the circumferential direction. Information is stored by establishing a magnetization in the easy direction in either a "1" or "0" sense. "Readout" is accomplished by interrogation fields which cause the magnetization vector to be displaced through some angle from its "1" or "0" orientation along an easy direction, thereby causing the component of magnetization in the easy direction to decrease. Upon removal of the interrogation field, the magnetization vector returns to its original orientation restoring the full value of the magnetization vector in the easy direction. These changes in the magnetization vector result in induced emfs which may be sensed as output signals. The magnitude and/or the polarity of these signals indicate the sense of the stored information. Since the magnetization direction is the same after readout as it is before, the net effect is a nondestructive readout operation. The reversibility of this process relies on the existence of a high magnetic anisotropy in the material.

One embodiment of a memory device which utilizes these principles employs solid magnetic wires with a stress-induced anisotropy. Another embodiment is the plated memory, in which a nonmagnetic substrate is overlayed with a thin coating of magnetic material with an induced anisotropy. The anisotropy may be induced by stressing the resulting coated substrate or by depositing the magnetic layer in the presence of a directional magnetic field. Other methods may also be used.

Where a plated memory element is contemplated, substrate surface characteristics are extremely important. In order to obtain consistent results with uniform adherence, stress, and magnetic characteristics, it is necessary to plate on a meticulously clean substrate. To this end, the cleaning procedure may utilize ultrasonically agitated detergent and rinse baths. Also, remaining unwanted oxide may be removed in a hydrogen furnace. Despite these precautions, nonuniformity in adherence, stress, and magnetic characteristics is observed in plated memories.

This invention is grounded on the discovery that certain additives may be advantageously deleted from at least one widely used substrate material, commercial beryllium-copper alloy, with the result of improved uniformity in its surface characteristics and in the characteristics of the plated elements. The particular additives which cause surface nonuniformity in the beryllium-copper substrate are cobalt, nickel, and iron. These elements are used by all alloy manufacturers to impart physical hardness to the beryllium-copper alloy.

Commercial compositions of beryllium-copper alloy are known to contain 0.14 weight percent iron, 0.27 weight percent cobalt, 0.3 weight percent nickel, and even higher percentages. In fact, ASTM standards for commercial beryllium-copper call for a minimum of 0.2 weight percent of nickel or cobalt or both.

An exemplary beryllium-copper alloy of this invention has a nominal composition of about 2.05–1.8 weight percent beryllium, remainder copper. Total impurity content in an amount up to 0.1 weight percent may be tolerated. The impurities may comprise the elements of cobalt, nickel, iron, and others, such as silver, lead, zinc, manganese, magnesium, silicon, chromium, phosphorous, and aluminum. Still further improvement in the substrate surface is realized by limiting the cobalt, nickel, and iron content to a maximum total weight percent of 0.05 and a preferred embodiment is so defined.

As just noted, the advantages taught by the invention may be obtained in various measure even with additions of cobalt, nickel, and iron up to 0.05 and even 0.1 total weight percent. However, when the invention alloy is destined for use in magnetic memory elements, it is preferable that the maximum content of cobalt, nickel, iron, individually not exceed 0.01 weight percent. Impurities such as aluminum and phosphorous may each be tolerated even up to 0.05 weight percent without detrimental effects.

One particular embodiment of the invention is found in a substrate composition with cobalt, 0.0001 to 0.0009 weight percent, nickel, 0.001 to .003 weight percent, iron, 0.001 to 0.009 weight percent and other general impurities, 0.0001 to 0.0009 weight percent. This composition provides a markedly improved substrate surface in that a more uniform surface results.

The precise explanation for the improvement of the beryllium-copper substrate surface when the invention composition is used is not known. It is suspected that the additives of cobalt, nickel and iron react with the beryllium to form beryllides which precipitate out of solution during the annealing and cold working steps necessary to reduce the alloy to the small dimensions used in memory units. These beryllides apparently roughen the surface and otherwise result in non-uniform surface irregularities. However, the invention as disclosed herein is not intended to be limited by this proposed theory.

Figure 2:
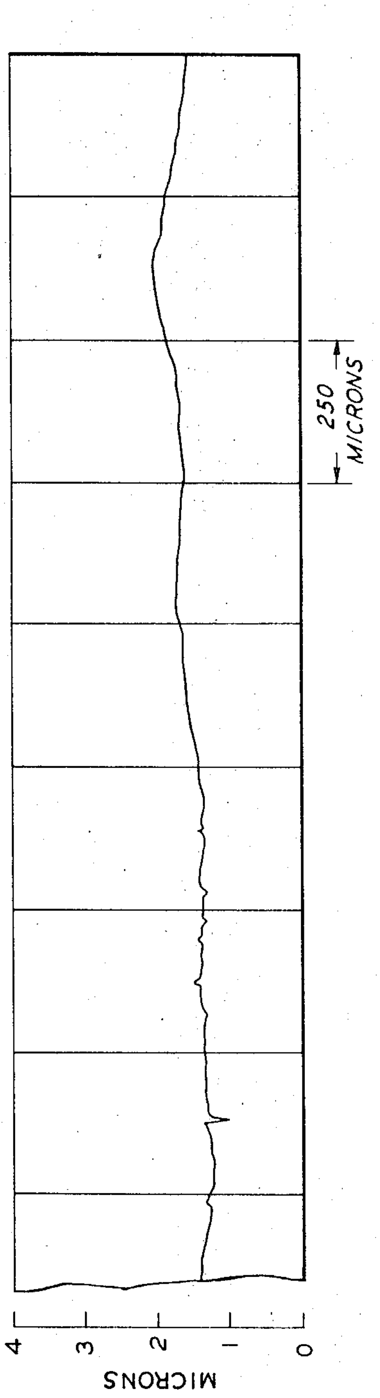
Figure 3:
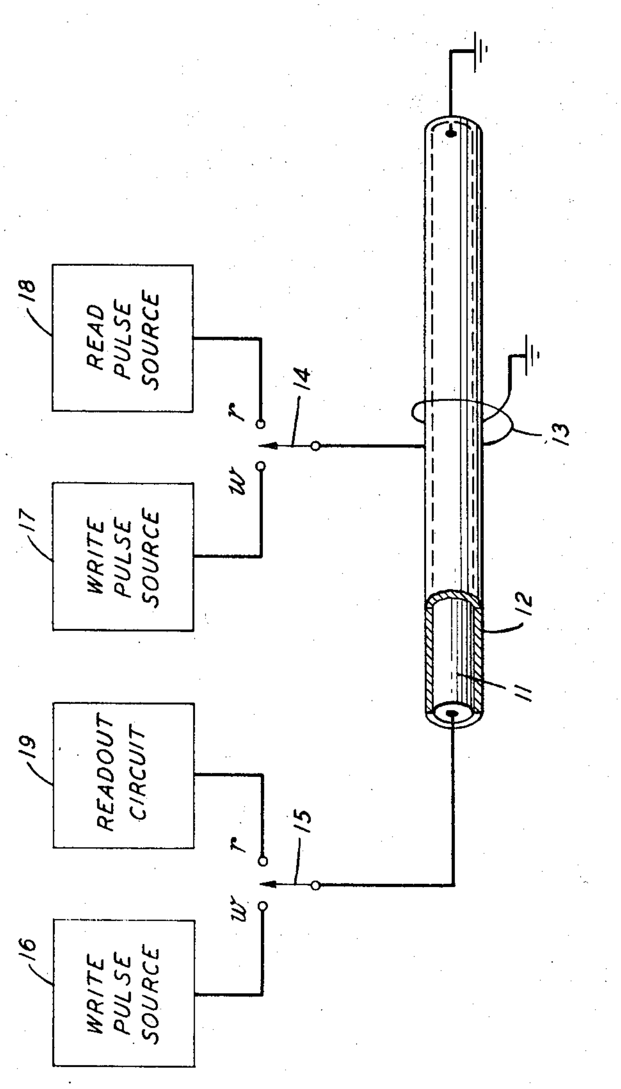

Reference is made to the drawing in which:

FIG. 1 is a graphic presentation of the results of a surface smoothness measurement of a commercial composition beryllium-copper alloy in the form of a .005 inch diameter wire analyzed as about 1.91 percent beryllium, 0.27 percent cobalt, 0.001 percent nickel, and 0.14 percent iron (by weight), remainder copper;

FIG. 2 is a graphic presentation of the results of a surface smoothness measurement of a beryllium-copper alloy of this invention in the form of a .005 inch diameter wire analyzed as 2.04 percent beryllium, 0.001 percent cobalt, .001 to .009 percent nickel, and .001 to .009 percent iron (by weight), remainder copper; and FIG. 3 is a perspective view of one embodiment of a plated magnetic memory element which includes the substrate of this invention in the form of a drawn wire, together with associated circuit means diagrammatically presented.

The data of FIG. 1 and FIG. 2 were obtained on a commercially available "Taly-Surf" machine which employs a fine sapphire wire to trace the surface texture of a sample wire, and which automatically presents such data graphically.

A comparison between the additive-containing beryllium-copper wire of FIG. 1 and the additive-free beryllium-copper wire of FIG. 2 clearly indicates the improvement of surface smoothness and uniformity that obtains when the substrate is substantially free of the additives. Desirable improvement in the beryllium-copper alloy surface may be obtained in accordance with this invention even with the presence of small amounts of cobalt, nickel and iron. Preferred ranges of these elements together with general impurity levels have been noted above.

One posible embodiment of a plated magnetic memory element which utilizes the improved substrate body of this invention is that shown in FIG. 3. The particular plated memory element depicted utilizes an electrically conducting substrate body 11 on which there is deposited a layer 12 of magnetic material. The material of substrate body 11 is of a composition in accordance with this invention. The magnetic material of layer 12 may be any suitable magnetic material such as one of the permalloy system of nickel-iron alloys. These and other related magnetic materials known to the art may be used advantageously with the improved beryllium-copper substrate of this invention. An illustrative permalloy is an alloy of 70 to 90 weight percent nickel, remainder essentially iron, but molybdenum-containing permalloy, with molybdenum up to 10 weight percent, is also suggested.

The substrate body 11, when made in accordance with the invention, may be plated electrolytically or by vapor deposition or other technique. There may be more than one layer deposited and more than one kind of material may be used in successive layers; for example, copper may be used as an intermediate layer between the beryllium-copper substrate and the magnetic layer to provide a chemically homogeneous surface on which the magnetic material may be deposited.

The information storage and read-out functions may be accomplished by the use of coincident currents, the magnetomotive force being supplied with wiper switches 14 and 15 in the *w* or write position from current sources 16 and 17, the first of which produces a current by means of lead 15 through conducting substrate body 11 which, at its other extremity is connected to ground and the second of which produces the other half current through lead 14 which is connected to winding 13, the other end of which is also grounded. The read function for the device depicted is accomplished by use of current source 18 and read-out circuit 19. With wiper switches 14 and 15 in the *r* or read position, current source 18 produces a pulse of sufficient magnitude to change the component of magnetization in the easy direction of any bit of the magnetic material of layer 12, and read out circuit 19 detects the voltage induced in substrate body 11 by the change in magnitization. The quality of the induced voltage permits circuit 19 to indicate the information that is stored in the bit so affected.

Certain variations and modifications of the invention described are apparent to those skilled in the art. These variations are intended to be within the scope of the appended claims.

What is claimed is:

1. An element comprising a mechanically reduced elongated substrate body, with at least one layer of material thereon, the composition of which substrate consists essentially of beryllium-copper alloy said substrate body possessing a substantially defect free surface finish due to the fact that said alloy is substantially free of cobalt, nickel, and iron, including less than a total of 0.1 weight percent of all elments aside from beryllium and copper.

2. The element of claim 1 in which said layer consists essentially of copper.

3. The element of claim 1 in which the maximum total amount of cobalt, nickel, iron in the substrate body composition is 0.05 weight percent.

4. The element of claim 3 in which the substrate body composition contains a maximum of 0.01 weight percent cobalt, 0.01 weight percent nickel, and 0.01 weight percent iron.

5. The element of claim 1 in which said layer is magnetic.

6. The element of claim 5 together with at least two electrically conducting leads positioned so as to conduct current into and out of said element, and together with means for establishing a magnetic flux path around said element.

7. The element of claim 6 in which there is a copper layer intermediate said substrate body and said magnetic layer.

8. The element of claim 7 wherein said magnetic layer consists essentially of nickel, 70–90 weight percent, molybdenum, 0 to 10 weight percent, remainder iron.

9. The element of claim 7 together with at least two electrically conducting leads positioned so as to conduct current into and out of said element, and together with means for establishing a magnetic flux path around said element.

References Cited

UNITED STATES PATENTS

| | | | |
|---|---|---|---|
| 2,192,495 | 3/1940 | Hessenbruch | 75—153 |
| 2,547,129 | 4/1951 | Klement | 75—153 |
| 2,945,217 | 7/1960 | Fisher et al. | 340—174 |
| 3,196,007 | 7/1965 | Wikle | 75—153 |
| 3,341,829 | 9/1967 | Meier | 340—174 |
| 3,350,180 | 10/1967 | Croll | 29—183.5 |
| 3,371,326 | 2/1968 | Fedde | 340—174 |
| 3,375,091 | 3/1968 | Feldtkeller | 29—196.3 |
| 3,411,892 | 11/1968 | Sasaki et al. | 29—183.5 |
| 3,422,407 | 1/1969 | Gould et al. | 340—174 |

OTHER REFERENCES

"Classification of Copper & Copper Alloys," Copper Development Association, 1952, pp. 6–7.

JAMES W. MOFFITT, Primary Examiner

U.S. Cl. X.R.

29—196.3; 117—235